United States Patent
Bethea

(10) Patent No.: US 10,888,072 B2
(45) Date of Patent: Jan. 12, 2021

(54) HANDHELD CRABTRAP SYSTEM

(71) Applicant: Arnold Bethea, Baltimore, MD (US)

(72) Inventor: Arnold Bethea, Baltimore, MD (US)

( * ) Notice: Subject to any disclaimer, the term of this patent is extended or adjusted under 35 U.S.C. 154(b) by 243 days.

(21) Appl. No.: 16/236,118

(22) Filed: Dec. 28, 2018

(65) Prior Publication Data

US 2020/0205385 A1 Jul. 2, 2020

Related U.S. Application Data

(63) Continuation-in-part of application No. 15/176,955, filed on Jun. 8, 2016, now abandoned.

(60) Provisional application No. 62/174,818, filed on Jun. 12, 2015.

(51) Int. Cl.
  *A01K 69/08* (2006.01)
  *A01K 63/02* (2006.01)
  *A01M 23/24* (2006.01)

(52) U.S. Cl.
  CPC .............. *A01K 69/08* (2013.01); *A01K 63/02* (2013.01); *A01M 23/24* (2013.01)

(58) Field of Classification Search
  CPC ........ A01K 69/00; A01K 69/06; A01K 69/08; A01K 69/10; A01K 74/00; A01K 77/00; A01K 79/00; A01K 97/12; A01K 99/00
  USPC .............. 43/100, 105, 4, 5, 11, 12, 7, 17, 58
  See application file for complete search history.

(56) References Cited

U.S. PATENT DOCUMENTS

| | | | | |
|---|---|---|---|---|
| 213,105 | A * | 3/1879 | Greenwood | A01D 46/247 56/333 |
| 1,750,163 | A * | 3/1930 | Disney | A01M 3/00 43/134 |
| 2,489,856 | A * | 11/1949 | Buford | A01M 23/16 43/102 |
| 2,656,642 | A * | 10/1953 | Richa | A01K 69/06 43/100 |
| 2,818,670 | A * | 1/1958 | Darkenwald | A01K 77/00 43/11 |
| 3,314,187 | A * | 4/1967 | Marcinkowski | A01K 69/10 43/105 |
| 3,508,358 | A * | 4/1970 | Lee | A01K 69/06 43/60 |
| 3,939,597 | A * | 2/1976 | McSherry | A01K 69/06 43/105 |
| 4,042,269 | A * | 8/1977 | Skermetta | A01K 23/005 294/1.5 |
| 4,134,226 | A * | 1/1979 | Petrella | A01K 69/06 43/102 |
| 4,139,961 | A * | 2/1979 | Markos | A01K 77/00 43/12 |
| 4,216,607 | A * | 8/1980 | Lyster | A01K 69/06 43/100 |

(Continued)

*Primary Examiner* — Magdalena Topolski
*Assistant Examiner* — Shada Mohamed Alghailani
(74) *Attorney, Agent, or Firm* — Bruce A. Lev

(57) ABSTRACT

A handheld crabtrap for catching crabs includes a shaft having a handle with a lever on a proximal end, a trap head with a lid at a distal end of the shaft, and a linkage within the shaft attached to the lever and the trap head. The handle further includes a crab alert bell attached to a cable that also extends to and into the trap head, where it ends in a clip to which the crabber's bait is attached. The trap head is held open via the linkage and lever until a crab pulls on the bait ringing the bell and alerting a crabber to pull on the lever and close the trap head via a string therebetween.

8 Claims, 3 Drawing Sheets

(56) References Cited

U.S. PATENT DOCUMENTS

| | | | | | |
|---|---|---|---|---|---|
| 4,236,741 | A * | 12/1980 | Emme | A01K 23/005 | 294/1.5 |
| 4,262,948 | A * | 4/1981 | Emme | A01K 23/005 | 294/1.5 |
| 4,272,906 | A * | 6/1981 | Liebling | A01K 77/00 | 43/11 |
| 4,765,089 | A * | 8/1988 | Rowe | A01K 69/06 | 43/102 |
| 4,831,774 | A * | 5/1989 | Gonzalez | A01K 69/06 | 43/100 |
| 4,980,989 | A * | 1/1991 | Davis | A01K 69/06 | 43/100 |
| 5,536,107 | A * | 7/1996 | Baker | A01K 77/00 | 403/389 |
| 5,555,666 | A * | 9/1996 | Glatzer | A01K 69/06 | 43/100 |
| 5,822,908 | A * | 10/1998 | Blanchard | A01K 77/00 | 43/11 |
| 6,164,710 | A * | 12/2000 | Shibuya | A01K 23/005 | 15/257.3 |
| 6,279,262 | B1 * | 8/2001 | Walkemeyer | A01M 3/02 | 43/134 |
| 6,327,809 | B1 * | 12/2001 | Comes | A01K 69/00 | 43/61 |
| 6,981,346 | B1 * | 1/2006 | Wiezycki | A01K 97/01 | 43/4 |
| 7,165,355 | B2 * | 1/2007 | George | A01M 3/022 | 43/135 |
| 7,631,910 | B2 * | 12/2009 | Shalhoub | A01K 23/005 | 294/1.5 |
| 7,735,886 | B2 * | 6/2010 | Tsukamoto | A01K 23/005 | 294/1.5 |
| 8,230,641 | B2 * | 7/2012 | Rich | A01M 23/24 | 43/61 |
| 9,095,127 | B2 * | 8/2015 | Kovarik | A01K 15/003 | |
| 10,542,737 | B2 * | 1/2020 | Beach | A01K 97/05 | |
| 2002/0011019 | A1 * | 1/2002 | Stoico | A01M 23/18 | 43/58 |
| 2009/0044443 | A1 * | 2/2009 | Flaherty | A01M 3/00 | 43/110 |
| 2009/0293337 | A1 * | 12/2009 | Arita | A01K 77/00 | 43/8 |
| 2013/0097917 | A1 * | 4/2013 | Shofet | A01M 3/00 | 43/107 |
| 2017/0303518 | A1 * | 10/2017 | Haugen | A01K 69/10 | |
| 2018/0035653 | A1 * | 2/2018 | Lawrence | A01K 69/08 | |

* cited by examiner

# HANDHELD CRABTRAP SYSTEM

CROSS-REFERENCE TO RELATED APPLICATION

The present application is related to and claims priority from prior provisional application Ser. No. 62/174,818, filed Jun. 12, 2015, and non-provisional application Ser. No. 15/176,955, filed Jun. 8, 2016, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of crab traps and more specifically relates to a handheld, extendable device for catching blue crabs to enable most anyone with a taste for blue crab to dramatically increase their success in catching this delicacy while proving especially easy to operate for those who have limited physical capabilities for any reason, or hand or arm ailments.

2. Description of the Related Art

The blue crab, *Callinectes sapidus* (Latin for "beautiful savory swimmer") is found in inshore Atlantic coastal waters from Nova Scotia to Argentina. And although both commercial and recreational crabbing are important activities along the entire Southeast coast, the blue crab is most closely associated with the Mid-Atlantic States, and the Chesapeake Bay. The blue crab, for example, is the State Crustacean of Maryland—and the chief enterprise, along with oysters, of the Bay's watermen.

And while the majority of the blue crab catch is commercial, the crabs being taken with crab-traps or pots, and scrapes and dredges, the recreational catch is also important to the Bay area's residents and vacationers. Catching crabs recreationally involves simple gear: a baited hand-line to attract the crab, and a dip-net to scoop the crab into. Crabbers also use wire or net baskets, placing a chicken neck or flounder-head in the basket, and waiting for the crab to climb in. These methods do work, but they require a substantial amount of patience and skill—and often as not, the crab climbs out of the net or basket on its way up. The invention to be presented and discussed in this report would offer crabbers a far better tool for catching the crab and getting him safely to steam-pot and table.

Various attempts have been made to solve the above-mentioned problems such as those found in U.S. Pat. No. 4,594,804 to Michael G. Misko; U.S. Pat. No. 4,956,935 to Henry N. Riddell; and U.S. Pat. No. 4,406,083 to Walter R. Hart. This art is representative of handheld crab traps with signaling devices, and various means for actuating the trap. None of the above inventions and patents, taken either singly or in combination, is seen to describe the invention as claimed.

Ideally, a handheld crabtrap should provide ease of use and a high success rate of catching crabs and, yet would operate reliably and be manufactured at a modest expense. Thus, a need exists for a reliable handheld crabtrap system to avoid the above-mentioned problems.

BRIEF SUMMARY OF THE INVENTION

In view of the foregoing disadvantages inherent in the known crab trap art, the present invention provides a novel handheld, extendable device for catching blue crabs. The general purpose of the present invention, which will be described subsequently in greater detail is to provide a handheld, extendable device for catching blue crabs. to enable most anyone with a taste for blue crab to dramatically increase their success in catching this delicacy while proving especially easy to operate for those who have limited physical capabilities for any reason, or hand or arm ailments.

A handheld crab trap is disclosed herein in a preferred embodiment comprising: a grip handle having a latch mechanism, a trigger mechanism, and an alert bell. It further has a connecting tube having a trip linkage, and a bell wire housed within, and trap head having a hinged portion with a biasing spring, a permeable pot, a transparent lid, and a bait clip. The grip handle has a latch mechanism, and a trigger mechanism attached within the grip handle, and an alert bell attached on an outside portion of the grip handle. The connecting tube has a trip linkage and bell wire housed within, with the trip linkage attached to the latch mechanism of the grip handle, and the bell wire attached to the alert bell on the grip handle.

When in use the transparent lid is pivoted by hand into an open position exposing the interior volume of the permeable pot, which in turn pulls the trip linkage and pivots the latch mechanism until it engages with the trigger mechanism to thereby lock the transparent lid in the open position. Then when the transparent lid is locked in the open position bait can be applied to the bait clip. Then when the transparent lid is locked in the open position and the bait clip is baited, the permeable pot can be lowered into waters where crabs reside. Then when a crab enters the interior volume of the permeable pot and pulls on the bait upon said bait clip the bell wire is pulled, which in turn pulls on and rings the alert bell. Then when the alert bell rings a user can pull the trigger mechanism which allows the trip linkage and said biasing spring to pivot the transparent lid to cover and enclose the interior volume of the permeable pot thereby trapping said crab therein.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, handheld crabtrap system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a crabtrap and more particularly to a handheld, extendable crabtrap device as used to improve the ability of users to catch blue crabs recreationally, and to enable most anyone with a taste for blue crab to dramatically increase their success in catching this delicacy while proving especially easy to operate for those who have limited physical capabilities for any reason, with hand or arm ailments.

Figure 1:
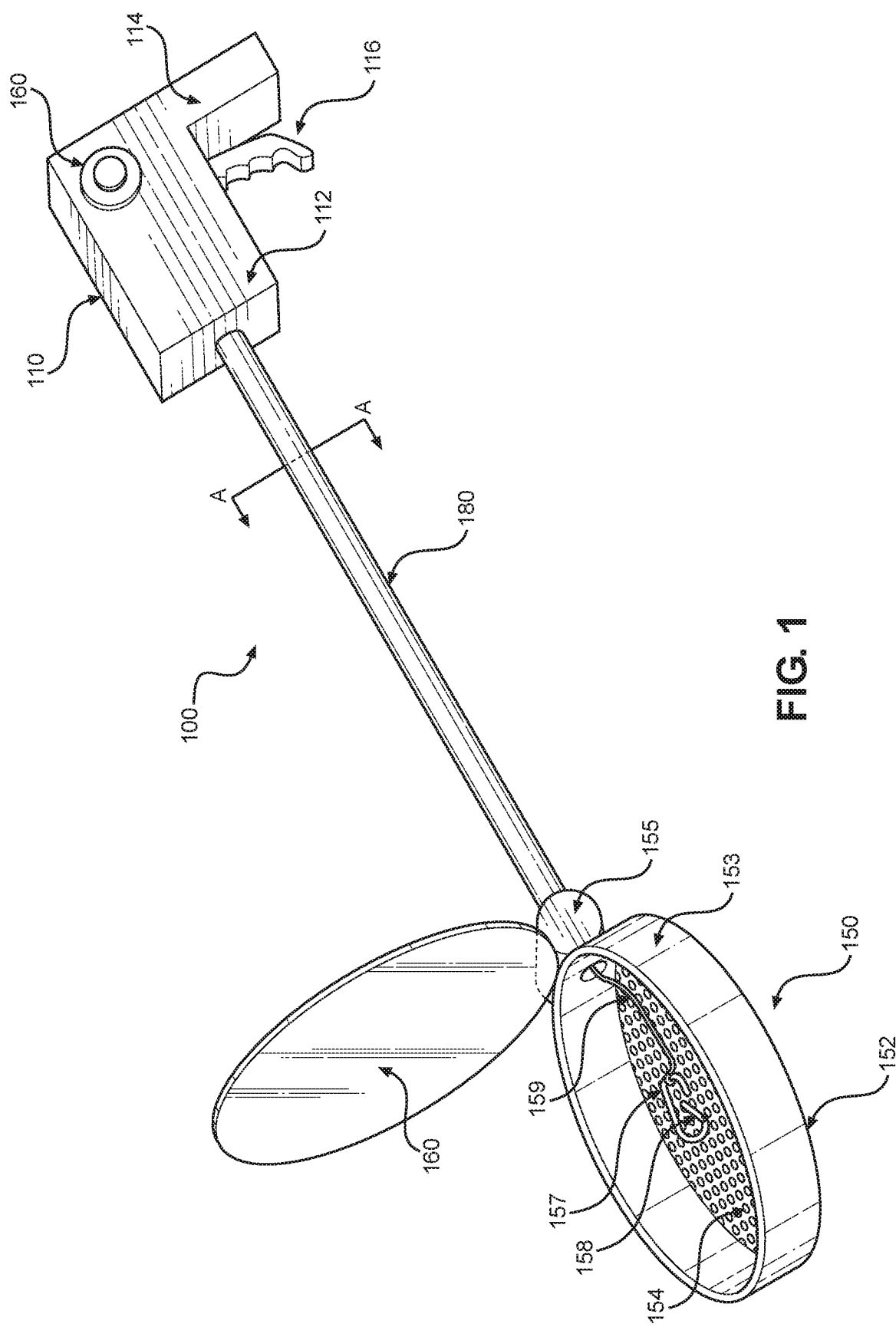
FIG. 1 is a perspective view of the handheld crabtrap system of the present invention with its trap head lid in an open position.
Figure 2:
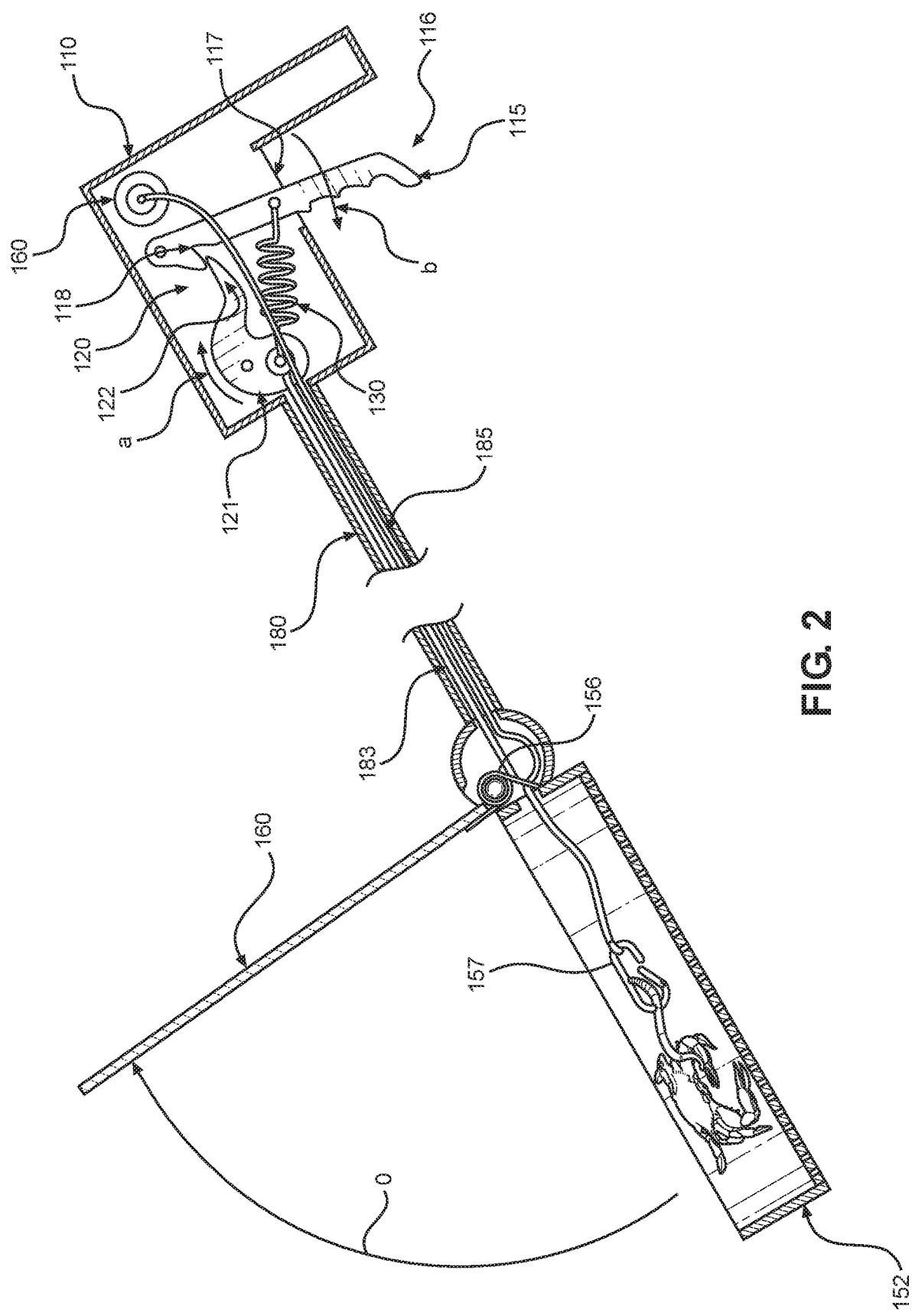
FIG. 2 is a cross-sectional view taken along cross-section A-A, shown in FIG. 1, and illustrating the handheld crabtrap system of the present invention with its trap head lid in an open position.
Figure 3:
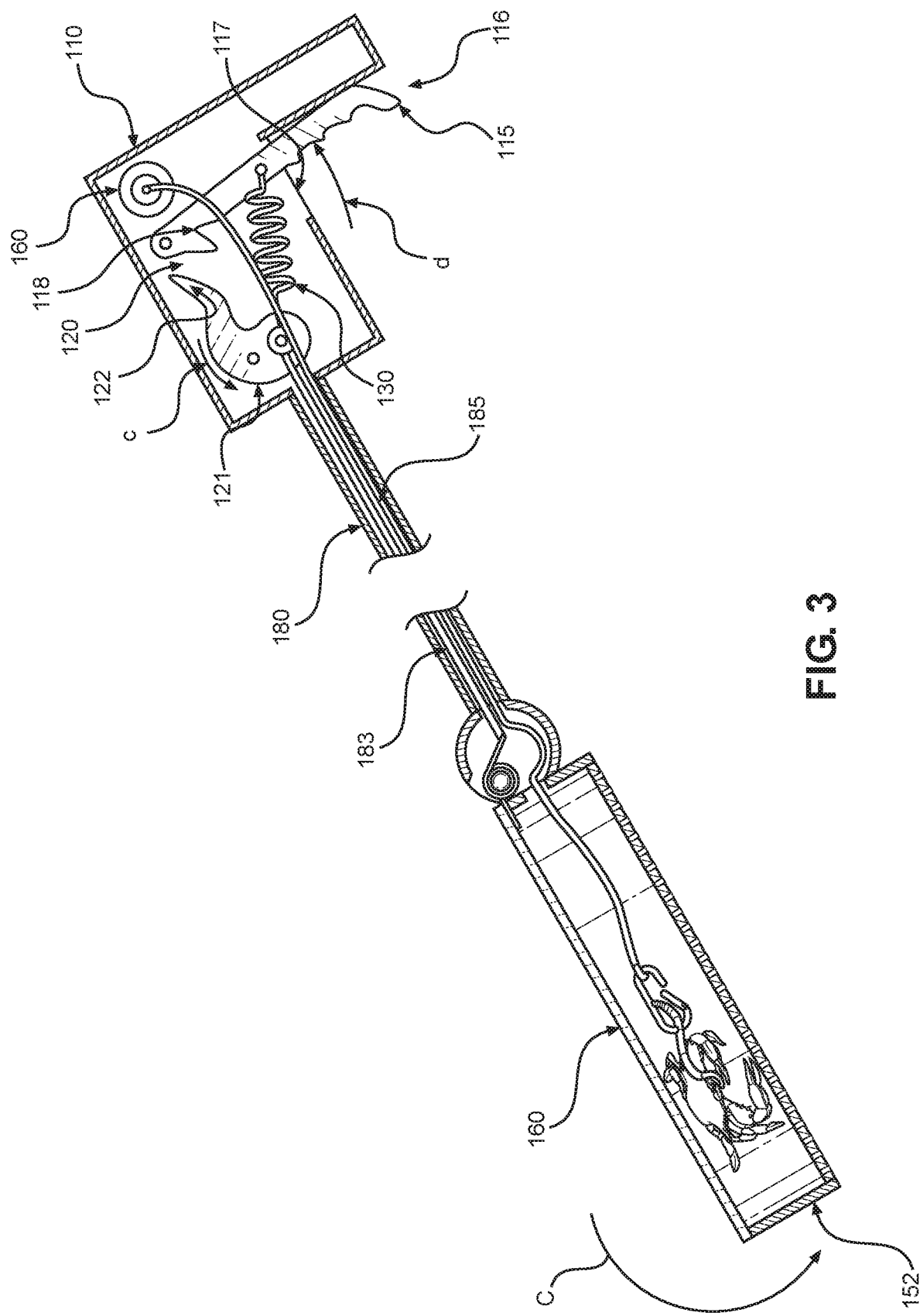
FIG. 3 is a cross-sectional view taken along cross-section A-A, shown in FIG. 1, and illustrating the handheld crabtrap system of the present invention with its trap head lid in a closed position.

Referring to the drawings by numerals of reference there is shown in FIGS. 1-3, a perspective view illustrating a handheld crab trap system 100 comprising a grip handle 110 including a housing 112 including a hand portion 114 adapted to be held by the hand of a person using the handheld crabtrap system, a plurality of walls forming a hollow interior volume, and an aperture 117 through one of the plurality of walls; a latch mechanism 120 including a main body 121 including a pawl 122 extending therefrom, wherein the main body is pivotally connected to an interior wall of the housing, a biased trigger mechanism 116 including an elongated handle 115, and a notch 118 adapted to releasably engage with the pawl 122 of the main body 121 of the latch mechanism 120, wherein the trigger mechanism 116 is pivotally connected to an interior wall of the housing 112, a trigger spring 130 connected between said main body of said latch mechanism and said elongated handle, an alert bell 160 connected to the housing; a trap head 150 including a permeable pot 152 including a permeable bottom wall 154, and at least one side wall 153 extending upwardly from the permeable bottom wall, wherein the permeable bottom wall and the at least one side wall define an interior volume of the permeable pot, a transparent lid 160 adapted to be pivotally connected to the at least one side wall and is adapted to removably cover and enclose the interior volume of the permeable pot, a hinged portion 155 including a biasing spring 156, wherein the hinged portion 155 is connected between the transparent lid and the at least one side wall and used to bias the transparent lid to a closed position "C" upon a top edge of the at least one side wall to thereby removably cover and enclose the interior volume of said permeable pot, and a bait clip 157 including a bait portion 158 adapted to releasable hold bait thereon, and a flexible wire 159 connected to the bait portion on one end and to an interior surface of the at least one side wall, wherein the bait clip is located within the interior volume of the permeable pot and adapted to attract and be grabbed and pulled by crabs entering the permeable pot; and an elongated connecting tube 180 forming an elongated hollow interior volume, and wherein the elongated connecting tube is connected between the housing of the grip handle and the hinged portion of the trap head; a trip linkage 183 located within the elongated hollow interior volume of the elongated connecting tube, and connected between the main body of the latch mechanism of the grip handle and the hinged portion, and a bell wire 185 located within the elongated hollow interior volume of the elongated connecting tube, and connected between the flexible wire of the bait clip and the alert bell of the grip handle.

As illustrated in FIG. 2, the transparent lid 160 can be pivoted by hand into an open position "O" exposing the interior volume of the permeable pot, which in turn pulls the trip linkage 183 and pivots the main body 121 of the latch mechanism 120 in direction "a" and the elongated handle 115 of the trigger mechanism 116 via trigger spring 130 in direction "b" until the pawl 122 of the latch mechanism engages with the notch 118 of the trigger mechanism 116 to thereby lock the transparent lid in the open position. Then when the transparent lid is locked in the open position bait can be applied to the bait portion 157 of the bait clip 158. Then when the transparent lid is locked in the open position and the bait clip is baited, the permeable pot can be lowered into waters where crabs reside.

As illustrated in FIG. 3, after a crab enters the interior volume of the permeable pot and pulls on the bait upon the bait clip the bell wire 185 is pulled, which in turn pulls on and rings the alert bell 160. Then when the alert bell 160 rings a user can pull and pivot the trigger mechanism 116 in direction "d" and into the release position, which disengages the pawl 122 from the notch 118, which in turn allows the main body 121 to rotate in direction "c", which in turn allows the trip linkage 183 and the biasing spring 156 to pivot the transparent lid 160 to cover and enclose the interior volume of the permeable pot thereby trapping the crab therein. Further, the transparent lid 160 is held in a closed position enclosing the interior volume of the permeable pot via the biasing spring 156 of the hinged portion 155 to prevent escape of the crab(s). The transparent lid 160 is also adapted to allow a user to see inside said permeable pot after a crab is caught to determine its size without touching it.

The permeable pot 152 may be 10 inches in diameter, and formed from molded thermoplastic. The alert bell 160 may be formed from a ferrous material, the elongated connecting tube 180 may be formed having a length between 4 feet and 12 feet, and the permeable bottom wall of the permeable pot is adapted to allow water to pass therethrough.

Handheld crabtrap system may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., or arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., for example, different orders within above-mentioned list, may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A handheld crabtrap system comprising:
   a grip handle including:
      a housing including:
         a hand portion adapted to be held by the hand of a person using said handheld crabtrap system;
         a plurality of walls forming a hollow interior volume; and
         an aperture through one of said plurality of walls;
      a latch mechanism including:
         a main body including:
            a pawl extending therefrom;
            wherein said main body is pivotally connected to an interior wall of said housing;
      a biased trigger mechanism including:
         an elongated handle; and
         a notch adapted to releasably engage with said pawl of said main body of said latch mechanism;
         wherein said trigger mechanism is pivotally connected to an interior wall of said housing; and
      a trigger spring;
         wherein said trigger spring is connected between said main body of said latch mechanism and said elongated handle;
      an alert bell;
         wherein said alert bell is connected to said housing;
   a trap head including;
      a permeable pot including:
         a permeable bottom wall; and
         at least one side wall extending upwardly from said permeable bottom wall;
         wherein said permeable bottom wall and said at least one side wall define an interior volume of said permeable pot;
      a transparent lid;
         wherein said transparent lid is adapted to be pivotally connected to said at least one side wall and is adapted to removably cover and enclose said interior volume of said permeable pot;
      a hinged portion including:
         a biasing spring;
         wherein said hinged portion is connected between said transparent lid and said at least one side wall and used to bias said transparent lid to a closed position upon a top edge of said at least one side wall to thereby removably cover and enclose said interior volume of said permeable pot; and
      a bait clip including:
         a bait portion adapted to releasable hold bait thereon; and
         a flexible wire;
            wherein said flexible wire is connected to said bait portion on one end and to an interior surface of said at least one side wall;
         wherein said bait clip is located within said interior volume of said permeable pot and adapted to attract and be grabbed and pulled by crabs entering said permeable pot; and
      an elongated connecting tube including;
         a hollow interior volume; and
         wherein said connecting tube is connected between said housing of said grip handle and said hinged portion of said trap head;
      a trip linkage;
         wherein said trip linkage is located within said hollow interior volume, and connected between said main body of said latch mechanism of said grip handle and said hinged portion; and
      a bell wire;
         wherein said bell wire is located within said elongated hollow interior, and connected between said flexible wire of said bait clip and said alert bell of said grip handle;
   wherein when in use said transparent lid is pivoted by hand into an open position exposing said interior volume of said permeable pot, which in turn pulls said trip linkage and pivots said main body of said latch mechanism and said elongated handle of said trigger mechanism via said trigger spring until said pawl of said latch mechanism engages with said notch of said trigger mechanism to thereby lock said transparent lid in said open position;
   wherein when said transparent lid is locked in said open position bait can be applied to said bait portion of said bait clip;
   wherein when said transparent lid is locked in said open position and said bait clip is baited, said permeable pot can be lowered into waters where crabs reside;
   wherein when a crab enters said interior volume of said permeable pot and pulls on said bait upon said bait clip said bell wire is pulled, which in turn pulls on and rings said alert bell; and
   wherein when said alert bell rings a user can pull and pivot said trigger mechanism into said release position, which disengages said pawl from said notch, which in turn allows said main body of said latch mechanism to rotate, which in turn allows said trip linkage and said biasing spring to pivot said transparent lid to cover and enclose said interior volume of said permeable pot thereby trapping said crab therein.

2. The handheld crabtrap system of claim 1, wherein said alert bell is formed from a ferrous material.

3. The handheld crabtrap system of claim 1, wherein said transparent lid is adapted to allow a user to see inside said permeable pot after a crab is caught to determine its size without touching it.

4. The handheld crabtrap system of claim 1, wherein said transparent lid is held in a closed position enclosing said interior volume of said permeable pot via said biasing spring of said hinged portion to prevent escape of said crab.

5. The handheld crabtrap system of claim 1, wherein said permeable pot is 10 inches in diameter.

6. The handheld crabtrap system of claim 1, wherein said permeable pot is formed from molded thermoplastic.

7. The handheld crabtrap system of claim 1, wherein said elongated connecting tube is formed having a length between 4 feet and 12 feet.

8. The handheld crabtrap system of claim 1, wherein said permeable bottom wall of said permeable pot is adapted to allow water to pass therethrough.

* * * * *